US008705025B2

(12) United States Patent
Crowther et al.

(10) Patent No.: US 8,705,025 B2
(45) Date of Patent: Apr. 22, 2014

(54) TRANSFERRING OPTICAL ENERGY

(75) Inventors: Blake Crowther, Preston, ID (US);
James Peterson, North Logan, UT (US)

(73) Assignee: Utah State University Research Foundation, North Logan, UT (US)

( * ) Notice: Subject to any disclaimer, the term of this patent is extended or adjusted under 35 U.S.C. 154(b) by 199 days.

(21) Appl. No.: 13/323,456

(22) Filed: Dec. 12, 2011

(65) Prior Publication Data

US 2012/0147362 A1    Jun. 14, 2012

Related U.S. Application Data

(60) Provisional application No. 61/422,277, filed on Dec. 13, 2010.

(51) Int. Cl.
*G01J 1/42* (2006.01)
*G01J 1/04* (2006.01)
*G01J 3/02* (2006.01)

(52) U.S. Cl.
USPC .......................... 356/222; 356/216; 356/326

(58) Field of Classification Search
USPC ........................ 356/218, 216, 222, 73.1, 437;
250/227.11, 227.14, 227.16
See application file for complete search history.

(56) References Cited

U.S. PATENT DOCUMENTS

| | | | |
|---|---|---|---|
| 4,173,415 A * | 11/1979 | Wyatt | 356/336 |
| 5,136,674 A * | 8/1992 | Kakiuchi et al. | 385/115 |
| 5,713,364 A * | 2/1998 | DeBaryshe et al. | 600/476 |
| 5,828,724 A * | 10/1998 | Kurtz | 378/70 |
| 6,822,236 B1 * | 11/2004 | Nelson et al. | 250/338.5 |
| 6,995,840 B2 | 2/2006 | Hagler | |
| 7,031,560 B2 * | 4/2006 | Lelong-Feneyrou et al. | 385/12 |
| 7,049,597 B2 * | 5/2006 | Bodkin | 250/353 |
| 7,189,958 B2 * | 3/2007 | Spillman et al. | 250/227.14 |
| 7,423,756 B2 | 9/2008 | Gordley | |
| 7,460,235 B2 | 12/2008 | Gordley | |
| 2004/0136666 A1 * | 7/2004 | Bruun-Larsen et al. | 385/115 |
| 2006/0153488 A1 * | 7/2006 | Takiguchi | 385/12 |
| 2010/0149538 A1 | 6/2010 | Fleischer et al. | |

FOREIGN PATENT DOCUMENTS

WO    WO9825128 A1    6/1998

OTHER PUBLICATIONS

Emily L Wilson, A hollow-waveguide gas correlation radiometer for ultra-precise column measurements of formaldehyde on Mars. Jul. 7, 2011. IOP Publishing Ltd.*
Heaps et al., Hollow-Core Optical Fiber Gas Correlation Radiometer for CH4, H2CO, and H2O vapor measurements on Mars, Dec. 2008, American Geophysical Union, Fall Meeting 2008, abstract #P53C-1465.
Wilson et al., A hollow-waveguide gas correlation radiometer for ultra-precise column measurements of formaldehyde on Mars, Measurement Science and Technology, Jul. 11, 2011, IOI Publishing.

* cited by examiner

*Primary Examiner* — Gregory J Toatley
*Assistant Examiner* — Maurice Smith

(57) ABSTRACT

For transferring optical energy, a first multimode wave guide transmits radiant energy with a homogenized beam to a first plurality of optical sensors of an array of optical sensors. The array measures the homogenized radiant energy. Each optical sensor of the first plurality of optical sensors measures a pixelized portion of the homogenized radiant energy. A method and system also perform the functions of the apparatus.

19 Claims, 5 Drawing Sheets

TRANSFERRING OPTICAL ENERGY

CROSS-REFERENCE TO RELATED APPLICATIONS

This application claims priority to U.S. Provisional Patent Application No. 61422277 entitled "SYSTEM AND METHOD FOR CAPTURING AND TRANSFERRING OPTICAL ENERGY" and filed on Dec. 13, 2010 for Blake Crowther et al., which is incorporated herein by reference.

BACKGROUND

1. Field

The present disclosure relates to a system and method for transferring energy from one optical system to another device, and in particular to a system and method for conveying and homogenizing an image through a wave guide to an array of optical sensors.

2. Description of the Related Art

Optical systems frequently capture radiant energy and transfer the radiant energy to an optical detector. The radiant energy may be indicative of the state or level of one or more target gases, radiant materials, or reflective materials.

BRIEF SUMMARY

An apparatus for transferring optical energy is disclosed. The apparatus includes an array of optical sensors. A first multimode wave guide transmits radiant energy with a homogenized beam to a first plurality of optical sensors of the array. The array measures the homogenized radiant energy. Each optical sensor of the first plurality of optical sensors measures a pixelized portion of the homogenized radiant energy. A method and system also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams in the Figures illustrate the architecture, functionality, and operation of possible implementations. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements. The term radiant energy is equivalent to optical energy. The terms image and scene are equivalent and refer to the radiant energy collected by an optical device as will be described hereafter.

While specific embodiments and applications have been illustrated and described, it is to be understood that the disclosed invention is not limited to the precise configuration and components disclosed herein. The described embodiments are to be considered in all respects only as illustrative, and not restrictive. The present invention may be embodied in other specific forms without departing from its fundamental functions or essential characteristics. Various modifications, changes, and variations apparent to those of skill in the art may be made in the arrangement, operation, and details of the system of the present invention disclosed herein without departing from the spirit, scope, and underlying principles of the disclosure.

Figure 1:
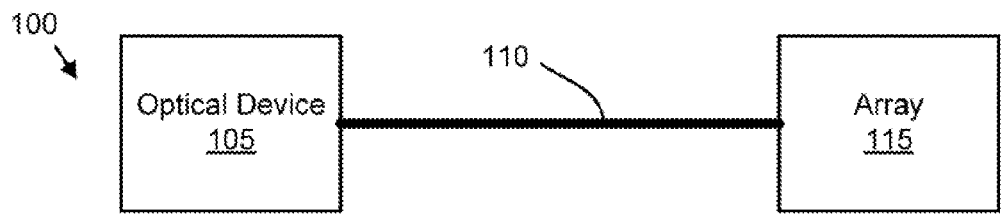
FIG. 1 is a schematic block diagram illustrating one embodiment of an optical system.

FIG. 1 is a schematic block diagram illustrating one embodiment of an optical system 100. The system 100 includes an optical device 105 and an array of optical sensors 115, hereinafter referred to as the array 115. The array 115 may be an array of charge coupled devices (CCD), charge integrating devices (CID), photomultipliers, or the like.

The multimode wave guide 110 transmits radiant energy at specified wavelengths as defined by the wave guide manufacture. A wave guide 110 transmitting at short-wave infrared or mid-wave infrared wavelengths may be used for emission radiometry, reflectance radiometry, or gas-correlation radiometry as will be described hereafter. The wave guide 110 transmits the radiant energy while simultaneously homogenizing the radiant energy beam. The use of a wave guide 110 may simplify optical design by replacing multiple components with the wave guide 110 such as a single flexible optical fiber strand.

The wave guide 110 is selected such that the wave guide 110 transmits a specified wavelength of radiant energy. The cross section of the wave guide 110 may be much larger than the longest wavelength of radiant energy to be transmitted such that multimode transmission is accomplished. The acceptance angle of the wave guide 110 may be matched to or greater than a cone of the radiant energy so as to be coupled into the wave guide end. The mechanical properties of the wave guide 110 may be selected to be appropriate to the environment in which the wave guide 110 is used.

Radiant energy from the optical device 105 is transmitted to the array 115 by the multimodal wave guide 110. The optical device 105 may be selected from the group consisting of a telescope, a radiometer, and a spectrophotometer. The optical device 105 may include an optical component. The optical component may direct the radiant energy to an end of the wave guide 110. In one embodiment, a diameter and an acceptance angle of the wave guide 110 are matched to the optical component.

In one embodiment, the wave guide 110 is an optical fiber. The optical fiber may be selected from the group consisting of visible-wave optical fiber, near-infrared optical fiber, short-wave infrared optical fiber, a mid-wave infrared optical fiber and a long-wave optical fiber. In one embodiment, the optical fiber is a step-indexed multimode optical fiber. Alternatively, the optical fiber may be a graded-index multimode optical fiber. In one embodiment, the wave guide 110 is selected from the group consisting of a light pipe and a tapered log.

In one embodiment, the wave guide 110 transmits the radiant energy with a homogenized beam. The wave guide 710 may defocus and/or diffuse the radiant energy. For example, modal dispersion of the radiant energy within the wave guide 110 may homogenize the radiant energy. In one embodiment, radiant energy entering the wave guide 110 at different angles may be transmitted through the wave guide 110 at different speeds, homogenizing and blurring the radiant energy by spreading the signal in time. In addition, the different speeds and angles of reflection of the photons of the radiant energy within the wave guide 110 may homogenize the radiant beam spatially.

The array 115 may measure the homogenized radiant energy. In one embodiment, each optical sensor of a first plurality of optical sensors of the array 115 measures of pixelized portion of the homogenized radiant energy.

Figure 2:
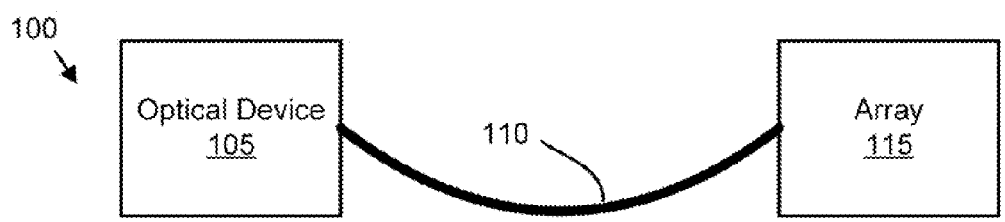
FIG. 2 is a schematic block diagram illustrating one alternate embodiment of an optical system.

FIG. 2 is a schematic block diagram illustrating one alternate embodiment of an optical system 100. The optical system 100 may be the optical systems FIG. 1. Image brightness variations may cause fluctuations in radiant energy, particularly when imaged directly on to a pixelized detector such as the array 115. This can lead to erroneous readings of gas levels in gas-correlation-filter radiometry, for example. A much more robust method of obtaining accurate overall signal levels is to homogenize the radiant energy beam incident upon the array 115 so that localized variations of the radiant energy do not cause anomalous signal values.

Bends and loops in the wave guide 110 may scramble or homogenize the image. Bends may be used to homogenize the beam of the radiant energy and reduce the effect of image brightness variations. A bend in an optical fiber is defined as a deviation from linearity. A deviation of 360 degrees in which a bend in the fiber results in a circular configuration is a loop. The bends in the wave guide 110 may homogenize the radiant beam by increasing modal dispersion.

The wave guide 110 is depicted with a bend. The bend may be in the range of 40° to 720°. In a certain embodiment, the bend is a 360° bend that forms, a loop. In one embodiment, the wave guide 110 includes a first bend and a second bend orthogonal to the first bend. The orthogonal bends may increase the homogenization of the radiant energy.

The wave guide 110 transfers the radiant energy to the optical sensor array 115, pixels within a focal plane array, or the like. The array 115 measures the radiant energy by converting incident photons or energy to an electrical output such as voltage or current.

Figure 3:
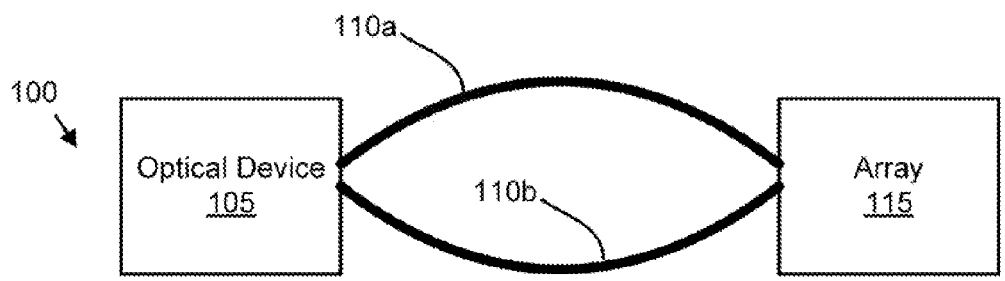
FIG. 3 is a schematic block diagram illustrating one alternate embodiment of an optical system.

FIG. 3 is a schematic block diagram illustrating one alternate embodiment of an optical system 100. The optical system 100 may be the optical systems 100 of FIGS. 1-2. Two wave guides 110 are depicted. One of skill in the art will recognize that the embodiments may be practiced with any number of wave guides 110.

In one embodiment, each wave guide 110 may pass different bands of radiant energy. For example, a first wave guide 110a may transmit near-infrared radiant energy and a second wave guide 110b may transmit short-wave infrared radiant energy. Alternatively, each wave guide may transmit radiant energy that has been filtered differently, exposed to different gases, exposed to different environments, or has traversed different paths.

Figure 4:
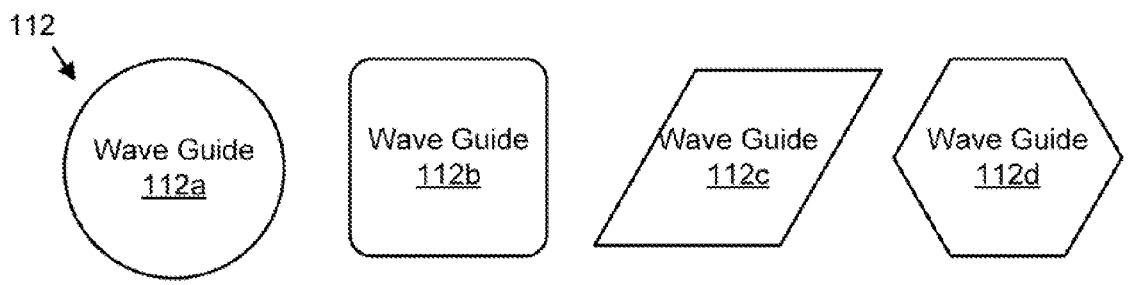
FIG. 4 is a schematic drawing illustrating one embodiment of wave guide cross-sections.

FIG. 4 is a schematic drawing illustrating one embodiment of wave guide cross-sections 112. The cross-sections 112 are the wave guides 110 of FIGS. 1-3. The cross sections 112 of the wave guide 110 are selected from the group consisting of circular 112a, trapezoidal 112c, square 112b, and hexagonal 112d cross sections. One of skill in the art will recognize that embodiments may be practiced with other cross-sectional geometries.

A length of the cross section 112 of the wave guide 110 may be in the range of 4 times to 1000 times a wavelength of a specified frequency of the radiant energy. In a certain embodiment, the cross section length of the wave guide 110 is in the range of 4 times to 4000 times the wavelength of the specified frequency of the radiant energy. Alternatively, the cross section length of the wave guide 110 is in the range of 4 times to 10,000 times the wavelength of the specified frequency of the radiant energy.

Figure 5:
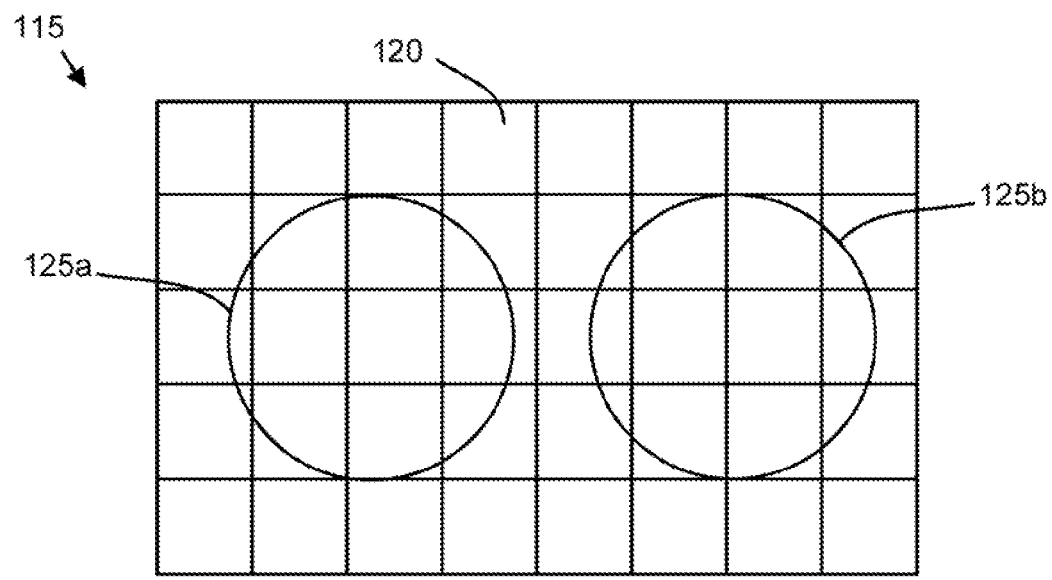
FIG. 5 is a schematic drawing illustrating one embodiment of a two-dimensional array.

FIG. 5 is a schematic drawing illustrating one embodiment of a two-dimensional array 115. The array 115 may be the array 115 in FIGS. 1-3. The array 115 may be a focal plane array. The array 115 may include a plurality of optical sensors 120. For clarity, only a representative optical sensor 120 is labeled. However, each grid represents an optical sensor 120. By transmitting the radiant energy to the plurality of optical sensors 120, the embodiment may average the radiant energy, increasing the accuracy and/or consistency of a measurement.

One or more wave guides 110 may transmit radiant energy to one or more pluralities of optical sensors 125 on the array 115. For example, the first wave guide 110a may transmit radiant energy to a first plurality of optical sensors 125a and the second wave guide 110b may transmit radiant energy to a second plurality of optical sensors 125b. A plurality of optical sensors 120 may include only whole optical sensors 120. Alternatively, the plurality of optical sensors 120 may include both whole and partial optical sensors 120. By employing a multiple pluralities of optical sensors 125, the embodiment may reduce differences in measurements due to differences in the optical sensors 120.

In one embodiment, the array 115 generates a first signal value for the first plurality of optical sensors 125a and a second signal value for the second plurality of optical sensors 125b. The signal strength values from each of the optical sensors 120 in the plurality of optical sensors 125 may be summed to generate the signal value. Alternatively, the signal strength values from each of the optical sensors 120 in the plurality of optical sensors 125 may be compared to generate the signal value.

Figure 6A:
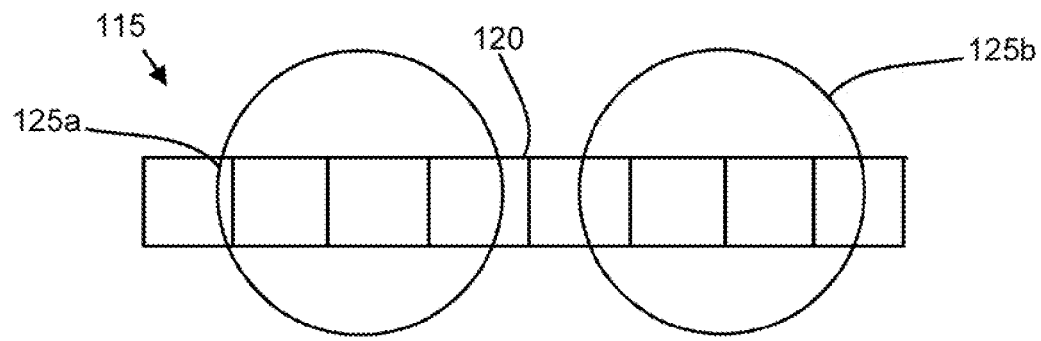
FIGS. 6A-B are schematic drawings illustrating embodiments of one-dimensional arrays.

FIG. 6A is a schematic drawing illustrating one embodiment of a one-dimensional array 115. The array 115 may be the array 115 in FIGS. 1-3. Although the array 115 is depicted as a 1×8 array, one of skill in the art may recognize that embodiments may be practiced with 1×N arrays, where N is an integer greater than one.

The array 115 may include a plurality of optical sensors 120. For clarity, only a representative optical sensor 120 is labeled. However, each grid represents an optical sensor 120. One or more wave guides 110 may transmit radiant energy to one or more pluralities of optical sensors 125 on the array 115. A plurality of optical sensors 120 may include only whole optical sensors 120. Alternatively, a plurality of optical sensors 120 may include both whole and partial optical sensors 120. By employing a multiple pluralities of optical sensors 125, the embodiment may reduce differences in measurements due to differences in the optical sensors 120.

Figure 6B:
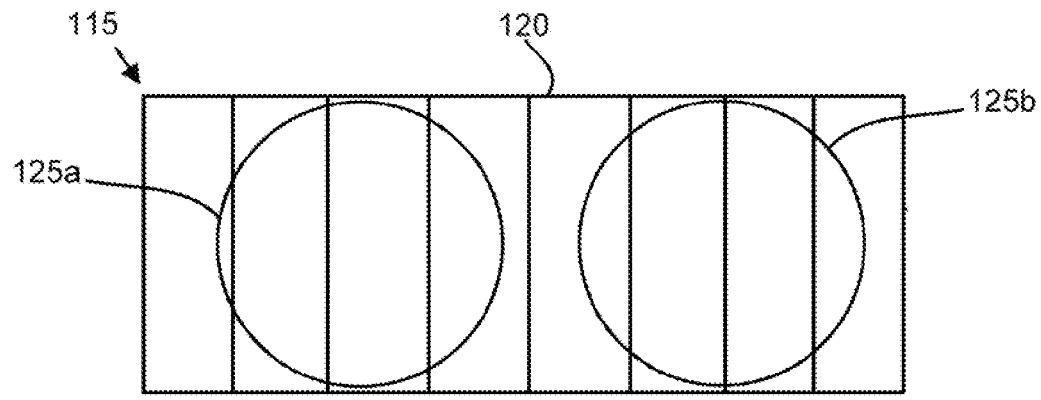

In FIG. 6A, the optical sensors 120 of the array 115 are depicted as receiving only a portion of the radiant energy transmitted by the wave guide 110. FIG. 6B is a schematic drawing illustrating one alternate embodiment of a one-dimensional array 115 of FIG. 6A. The optical sensors 120 of the array 115 of FIG. 6B are depicted as receiving all of the radiant energy transmitted by the wave guide 110.

Figure 7:
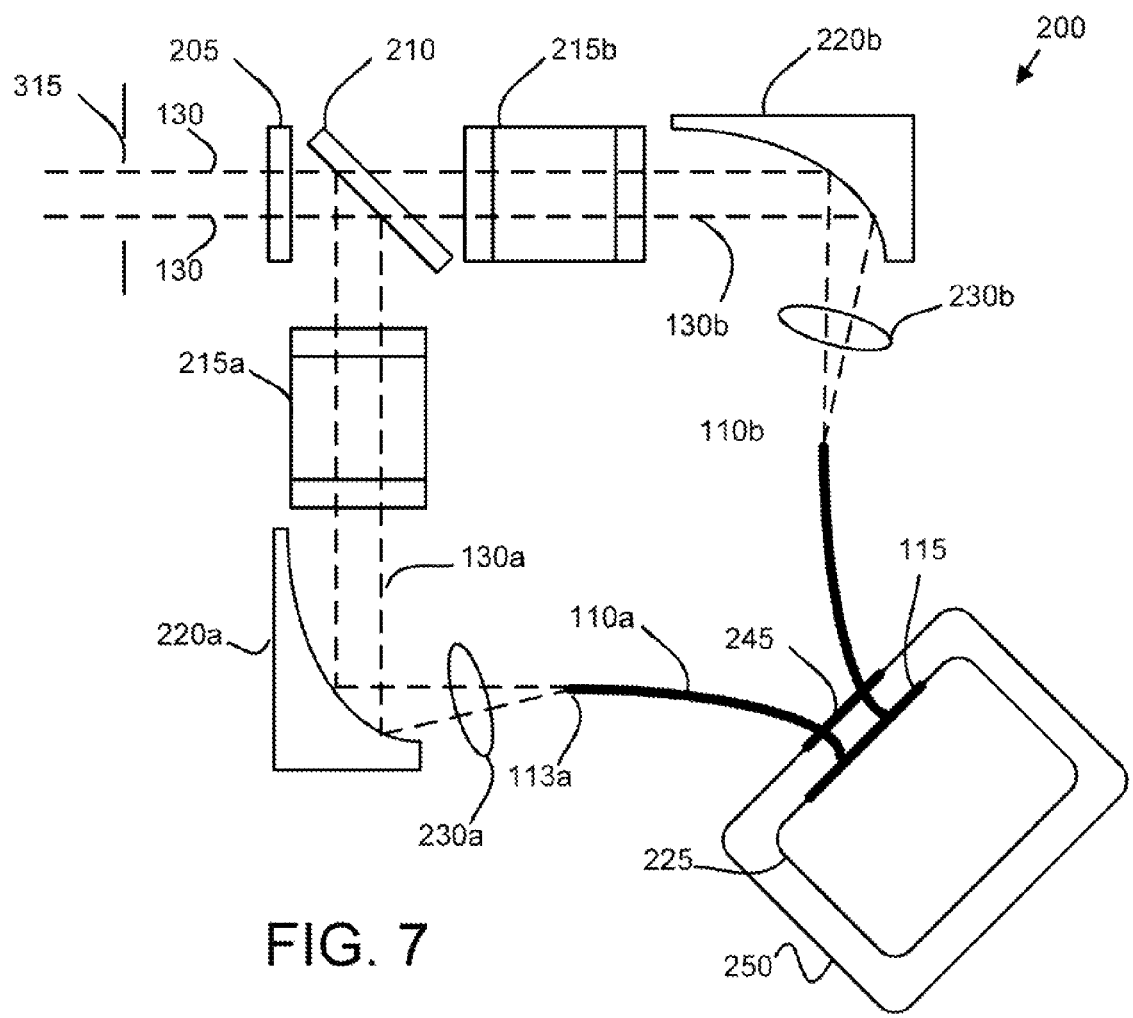
FIG. 7 is a top-view schematic drawing illustrating one embodiment of a gas-filter-correlation radiometer (GFCR)

FIG. 7 is a top-view schematic drawing illustrating one embodiment of a GFCR 200. The GFCR 200 may measure characteristics of one or more gases including but not limited to a gas level. The GFCR 200 may measure the gas characteristics despite a changing image. As a result, the GFCR 200 may measure average image energy to reduce the effects of image fluctuations.

The input image, composed of radiant energy, is collected by a common optical device 105, such as a telescope, radiometer, spectrophotometer or the like that will be described hereafter, and directed to a field stop position 315. In the depicted embodiment, the field stop position 315 may be an aperture of the GFCR 200. Alternatively, the field stop position 315 may be an aperture of a wave guide 110.

A radiant energy 130 enters the GFCR 200. A spectral filter 205 may filter out one or more frequencies of the radiant energy 130. The spectral filter 205 may be a notch filter, a band pass filter, or the like. The spectral filter 205 may only pass specified wavelengths of radiant energy. A beam splitter May divide the radiant energy 130 into two or more beams 130a,b.

Each beam 130a,b of radiant energy 130 may pass through a gas cell 215. Each gas cell 215 may enclose a specified gas and/or combination of gases. The gases may absorb target wavelengths of the radiant energy 130. In one embodiment, a first gas cell 215a may enclose the specified gas and/or combination of gases while a second gas cell 215b may not contain a gas. Alternatively, the first gas cell 215a may contain a first specified gas and/or combination of gases and the second gas cell 215b may contain a second specified gas and/or combination of gases.

A first mirror 220a and a first lens 230a may direct the first beam 130a to a first end 113a of a first wave guide 110a. In addition, a second mirror 220b and a second lens 230b may direct the first beam 130a to a first end 113b of a second wave guide 110b. Each mirror 220 and lens 230 combination may form the optical component.

The wave guide 110 may pass through a cap 245 with a sealable orifice into a vacuum vessel 250. The vacuum vessel 250 may encompass the array 115 and maintain a vacuum. The array 115 may be embodied in a sensor 225. In one embodiment, the array 115 and the sensor 225 may be cooled to at least 77° Kelvin (K). Alternatively the array 115 and the sensor 225 may be cooled to the range of absolute zero to 70° K.

The wave guides 110 may homogenize the radiant energy 130 so that the GFCR 200 may generate a high-precision measurement of the radiant energy intensity. In one embodiment, the signal values of first and second pluralities of optical sensors 125 are compared to generate the measurement. The signal values may be compared to accurately measure the radiant energy for various levels of absorption by the gas filters. In one embodiment, gas levels for the image are determined by comparing the signal values.

Figure 8:
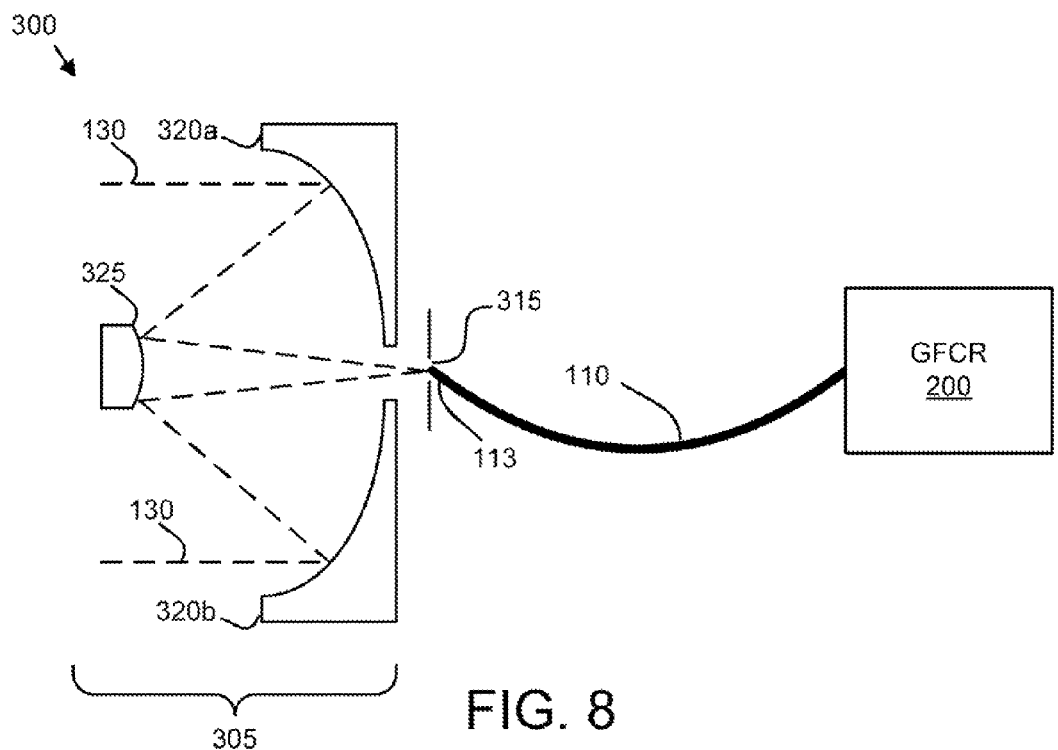
FIG. 8 is a top-view schematic drawing illustrating one embodiment of a telescope and GFCR connected by a wave guide.

FIG. 8 is a top-view schematic drawing illustrating one embodiment of a telescope 305 and GFCR 200 connected by a wave guide 110. The GFCR 200 may be the GFCR 200 of FIG. 7. The telescope 305 includes a primary mirror 320 and a secondary mirror 325. In addition, the telescope 305 may include the field stop position 315.

The wave guide 110 may be disposed at the field stop position 315 to receive the radiant energy 130 from the telescope 305. The radiant energy within the field of view at the field stop position 315 is coupled to the wave guide 110 by placing a wave guide end 113 at that field stop position 315 and assuring an acceptance angle of the wave guide 110 includes the incoming cone of radiant energy. Other known coupling methods using optical components may be used. The radiant energy is transmitted through the wave guide 110. The wave guide 110 may transmit the radiant energy 130 to the GFCR 200 to measure the strength of wavelengths of the radiant energy 130.

Figure 9:
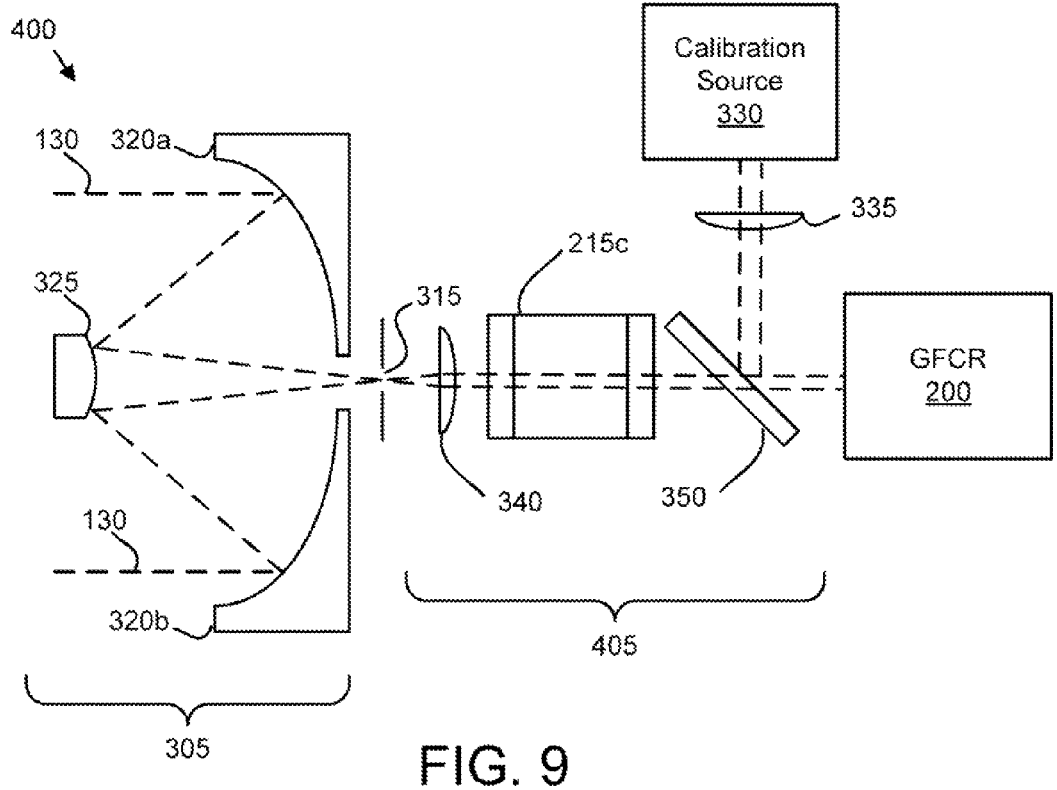
FIG. 9 is a top-view schematic drawing illustrating one embodiment of a telescope and GFCR connected by a optical elements.

FIG. 9 is a top-view schematic drawing illustrating one embodiment of a telescope 305 and a GFCR 200 connected by optical elements 405. The telescope 305 is the telescope 305 of FIG. 8. The GFCR 200 is the GFCR 200 of FIG. 7. The optical elements 405 include a first lens 340, a gas filter 215c, a beam combiner 350, a second lens 335, and a calibration source 330. The gas filter 215c may enclose a composition of gases similar to a target atmosphere. The first lens 340 may focus the radiant energy 130 through the gas filter 215c to the beam combiner 350.

The calibration source 330 may direct additional radiant energy 130 through the second lens 335. In one embodiment, the beam combiner 350 may pass either the radiant energy 130 from the gas filter 215c or from the calibration source 330. When the known radiant energy 130 from the calibration source 330 is directed to the GFCR 200, the signal values generated by the GFCR 200 are calibrated. With the GFCR 200 calibrated, the telescope 305 and GFCR 200 may be used to measure the radiant energy 130 received through the telescope 305.

Alternatively, the beam combiner 350 may combine the calibration source radiant energy 130 with the radiant energy 130 from the gas filter 215c and direct the combined radiant energy to the GFCR 200. The calibration source 330 may be switched on and switched off to determine signal drift in the measurement of the radiant energy 130 by the GFCR 200. For example, the signal values generated by the GFCR 200 when the calibration source 330 is switched on may be compared to signal values generated by the GFCR 200 when the calibration source 330 is switched off. Because the strength of the calibration source radiant energy is known, signal drift may be accurately estimated. With the GFCR 200 calibrated, the telescope 305 and GFCR 200 may be used to measure the radiant energy 130 received through the telescope 305.

Figure 10:
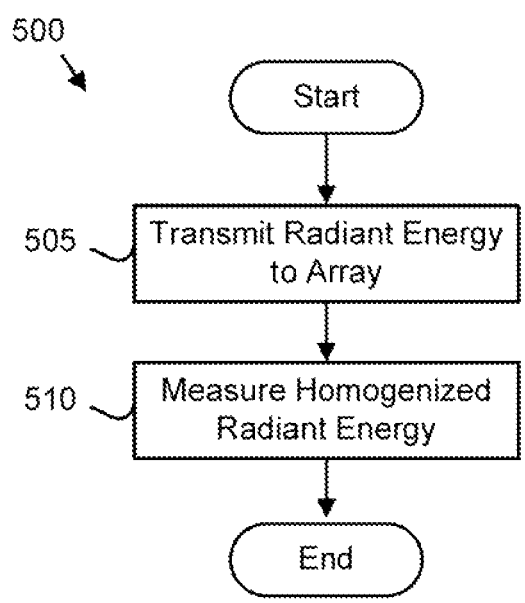
FIG. 10 is a schematic flow chart diagram illustrating one embodiment of a radiant energy transfer method.

FIG. 10 is a schematic flow chart diagram illustrating one embodiment of a radiant energy transfer method 500. The method 500 may perform the functions of the apparatus and system described in FIGS. 1-9.

The method 500 begins and in one embodiment, the wave guide 110 transmits 505 the radiant energy 130 to the array 115. The wave guide 110 homogenizes the radiant energy 130 as the radiant energy is transmitted. The array 115 measures 510 the homogenized radiant energy 130 and the method 500 ends.

By employing a wave guide 110 that both transmits radiant energy 130, and homogenizes the radiant energy beam, the embodiments may reduce noise and other discontinuities in the image. In addition, the by averaging the homogenized beam over one or more pluralities of optical sensors 120, the embodiments may further reduce the effects of noise and other discontinuities in the image. As a result, the GFCR 200 may more accurately measure signal values from the image.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a single array of optical sensors disposed in a vacuum vessel;
   a first multimode wave guide transmitting radiant energy with a homogenized beam to a first plurality of optical sensors of the single array;
   a second multimodal wave guide transmitting the radiant energy with a homogenized beam to a second plurality of optical sensors of the single array; and
   the single array measuring the homogenized radiant energy, each optical sensor of the first plurality of optical sensors measuring a pixelized portion of the homogenized radiant energy transmitted through the first multimode wave guide and each optical sensor of the second plurality of optical sensors measuring a pixelized portion of the homogenized radiant energy transmitted through the second multimode wave guide.

2. The apparatus of claim 1, wherein the wave guide is an optical fiber.

3. The apparatus of claim 2, wherein the optical fiber comprises a first bend and a second bend orthogonal to the first bend.

4. The apparatus of claim 2, wherein the optical fiber is selected from the group consisting of visible-wave optical fiber, near-infrared optical fiber, short-wave infrared optical fiber, a mid-wave infrared optical fiber and a long-wave optical fiber.

5. The apparatus of claim 2, wherein the optical fiber is a step-indexed multimode optical fiber.

6. The apparatus of claim 2, wherein the optical fiber is a graded-index multimode optical fiber.

7. The apparatus of claim 1, wherein the first multimodal wave guide and the second multimodal wave guide transmit different bands of radiant energy.

8. The apparatus of claim 1, further comprising a first optical device collecting the radiant energy from an image and a mirror and lens configured to direct the radiant energy to a first end of the wave guide.

9. The apparatus of claim 8, wherein a diameter and an acceptance angle of the wave guide is matched to the optical component.

10. The apparatus of claim 8, wherein the first optical device is selected from the group consisting of a telescope, radiometer, or spectrophotometer.

11. The apparatus of claim 1, wherein the wave guide is selected from the group consisting of a light pipe and a tapered rod.

12. The apparatus of claim 1, wherein a cross section of the wave guide is selected from the group consisting of circular, hexagonal, trapezoidal, and square cross sections.

13. The apparatus of claim 1, wherein a cross section length of the wave guide is in the range of 4 times to 1000 times a wavelength of a specified frequency of the radiant energy.

14. The apparatus of claim 1, further comprising a vacuum vessel, wherein the single array is cooled to 77° Kelvin or lower, the apparatus further comprising a cap with a sealable orifice, the wave guide passing through the orifice into the vacuum vessel.

15. The apparatus of claim 1, wherein the single array is a 1×N array of optical sensors.

16. A method for transferring optical energy comprising:
   transmitting a first portion of radiant energy through a first multimode wave guide with a first homogenized beam to a first plurality of optical sensors of a single array of optical sensors disposed in a vacuum vessel;
   transmitting a second portion of the radiant energy through a second multimode wave guide with a second homogenized beam to a second plurality of optical sensors of the single array of optical sensors disposed in a vacuum vessel; and
   measuring the homogenized radiant energy of the first and second homogenized beams with the single array, each optical sensor of the first plurality of optical sensors measuring a pixelized portion of the homogenized radiant energy of the first homogenized beam and each optical sensor of the second plurality of optical sensors measuring a pixelized portion of the homogenized radiant energy of the second homogenized beam.

17. A system comprising:
   a single array of optical sensors disposed in a vacuum vessel;
   a beam splitter splitting a beam of radiant energy into a first beam and a second beam;
   a first multimode wave guide transmitting the first beam with a homogenized beam to a first plurality of optical sensors of the single array;
   a second multimode wave guide transmitting the second beam with a homogenized beam to a second plurality of optical sensors of the single array; and
   the single array measuring the homogenized radiant energy of the first and second beams, each optical sensor of the first plurality of optical sensors measuring a pixelized portion of the homogenized first beam and each optical sensor of the second plurality of optical sensors measuring a pixelized portion of the homogenized second beam.

18. The system of claim 17, wherein each wave guide is an optical fiber that comprises a first bend and a second bend orthogonal to the first bend.

19. The system of claim 17, further comprising a third wave guide transmitting the radiant energy from a field stop position to the beam splitter.

* * * * *